350-376 SR
XR 3,928,870
7 X 4029 D

United S [11] 3,928,870
Ahrenkiel et [45] Dec. 23, 1975

[54] MAGNETO-OPTICAL PROCESSES AND ELEMENTS USING TETRAHEDRALLY COORDINATED DIVALENT COBALT-CONTAINING MAGNETIC MATERIAL

[75] Inventors: Richard K. Ahrenkiel; Theodore J. Coburn, both of Rochester, N.Y.

[73] Assignee: Eastman Kodak Company, Rochester, N.Y.

[22] Filed: Dec. 14, 1973

[21] Appl. No.: 425,045

[52] U.S. Cl. ............... 360/59; 252/62.51; 350/151; 360/114; 360/131

[51] Int. Cl.[2]... G11B 5/02; G11B 5/32; G11B 5/62; H01F 1/00

[58] Field of Search...................... 360/59, 114, 131; 252/62.51; 350/151; 340/174 YC

[56] References Cited

UNITED STATES PATENTS 3,521,257 7/1970 Nelson .............................. 360/114

OTHER PUBLICATIONS

Ahrenkiel et al., "Giant Magneto-Reflectance of $CoCr_2S_4$", *Solid State Communications*, Vol. 12, June 1973, pp. 1113–1115.

Ahrenkiel et al., "Hot-Pressed $CoCr_2S_4$: A Magneto-Optical Memory Material," *Appl. Phys. Lett.*, Vol. 22, No. 7, Apr. 1973, pp. 340–341.

Carnall et al., "Hot Pressed $CoCr_2S_4$", *Material Research Bulletin*, Vol. 7, pp. 1361–1368, Dec. 1972.

*Primary Examiner*—Robert S. Tupper
*Attorney, Agent, or Firm*—R. P. Hilst

[57] ABSTRACT

A magneto-optical readout process which employs a tetrahedrally coordinated divalent cobalt-containing magnetic material is provided. This magnetic material exhibits giant magneto-optical effects when exposed to radiation having a wavelength corresponding to a crystal field transition of the cobalt. Improved magnetic elements such as recording elements and improved thermomagnetic recording processes employing a tetrahedrally coordinated divalent cobalt-containing magnetic material are also disclosed.

24 Claims, 9 Drawing Figures

3928870
OR IN 360/59

MAGNETO-OPTICAL PROCESSES AND ELEMENTS USING TETRAHEDRALLY COORDINATED DIVALENT COBALT-CONTAINING MAGNETIC MATERIAL

FIELD OF THE INVENTION

This invention relates to magneto-optical processes, magnetic materials for use in the same, and improved magnetic elements and improved thermomagnetic recording processes.

BACKGROUND OF THE INVENTION

As is well-known, "magneto-optical" properties or effects, which are exhibited in varying degrees by all magnetic materials, have many potentially advantageous applications. The term magneto-optical as conventionally used in the art and as defined herein describes the family of properties associated with the modulation of a beam of electromagnetic radiation incident upon the surface of a magnetic material which is caused by and is related to the magnetization, at every point, of the magnetic material. For example, the rotation of the plane of polarization of a beam of plane-polarized light reflected from the surface of one magnetic domain of the magnetic material may be used to detect the alignment of the magnetic field within that particular domain. If the magnetic material which is exposed to the light beam is thin enough to transmit a portion of the polarized beam of light, one can detect the change in the polarization of the beam of light transmitted through the thin film of the material. The change in polarization of a beam of light transmitted through a thin film of magnetic material is typically measured as the amount of Faraday rotation (degrees/cm.) of the electric field vector of the electromagnetic wave or as transmission circular dichroism (percent). If the magnetic material at least partially reflects the incident beam of polarized radiation, the change in the polarization of the beam of light reflected from the surface of the material may be measured. The change in polarization of a beam of light reflected from the surface of a magnetic domain of a magnetic material is typically measured as the amount of Kerr rotation (degrees), Kerr ellipticity (degrees), or as reflectance circular dichroism (percent) which can be directly related to Kerr ellipticity. Reflectance circular dichroism is often referred to herein as RCD.

A number of magnetic materials have been suggested in recent years for use as magneto-optical materials. As reported in "Materials for Magneto-Optic Memories" by R. W. Cohen and R. S. Mezrich in *RCA Review*, Vol. 33, March, 1972, pp. 64–67, materials which have heretofore been proposed for use as magneto-optic materials include, in addition to elemental ferromagnetic materials such as Fe, Co and Ni, the intermetallic compounds MnBi and MnAlGe, the magnetic semiconductor EuO, the insulating ferrimagnetic materials $Gd_3Fe_5O_{12}$ and $Y_3Fe_5O_{12}$, and the granular ferromagnetic materials composed of elemental ferromagnetic grains of, for example, Ni, Co or Fe embedded in an insulating matrix such as $SiO_2$. A typical granular ferromagnetic material is $Co_{1-x}(SiO_2)_x$ where $0<x<1$.

Typically, if the above-mentioned magneto-optical materials, regardless of the particular means for changing the direction of magnetization within discrete areas of the magneto-optical material, are used in an optical readout process, a beam of polarized electromagnetic radiation is used to scan the magnetic material. Depending upon whether a reflectance mode or transmission mode of readout is used, there is produced a change in the polarization of the scanning beam of light which is reflected from or transmitted through the magneto-optical material. This change in polarization is caused by a change in the direction of magnetization in discrete areas of the magneto-optical material. Thus, by employing suitable means for detecting this change in polarization of the scanning beam of light, one can identify the direction of magnetization in each discrete area of the magnetic material. For example, using a laser beam one could, in principle, determine the direction of magnetization in each discrete magnetic domain of a magnetic material.

Although, as noted above, many different magnetic materials have been suggested for use in a variety of theoretically attractive applications based on the magneto-optical properties of these materials, very few, if any, such applications have been successfully commercialized to date. This has occurred primarily as a result of materials-related problems. That is, the concept of using the magneto-optical properties of a magnetic material does offer real advantages, but most of the magnetic materials which have been explored to date possess severe materials limitations. For example, EuO, which exhibits one of the largest known Kerr rotations measured to date, has a Curie temperature of about 69° K., thus requiring the use of a cryogenic environment which, in turn, requires large amounts of energy and expensive coolant materials to maintain. On the other hand, more conventional magnetic materials such as elemental iron, cobalt and the like, although exhibiting large magneto-optical effects, e.g., a Kerr ellipticity of about 0.5°, also exhibit other substantial disadvantages such as very high Curie temperatures greater than 600° K. and high thermal conductivities.

To date, only minimal investigations of the magneto-optical properties of inorganic magnetic crystalline materials having divalent cobalt in the tetrahedral position of the crystal lattice have been made. (See, for example, Carnall et al., "Hot Pressed $CoCr_2S_4$: A Potentially Useful Magneto-Optic Material", appearing in *Material Research Bulletin*, Vol. 7, pp. 1361–1368, published by Pergamon Press, Inc., December, 1972. See also Carnall et al., U.S. patent application Ser. No. 181,992, now U.S. Pat. No. 3,803,044, entitled "Polycrystalline Chalcogenide Spinels", filed Sept. 20, 1971.) The results of these investigations, however, would lead one to believe that these divalent tetrahedral cobalt-containing magnetic materials offer no significant advantage over other more widely investigated magneto-optical materials. For example, in the above-referenced article by Carnall et al, a hot-pressed polycrystalline unitary solid composed of $CoCr_2S_4$ was subjected to near infrared and infrared polarized light of varying wavelengths over the range of from about 4 to about 15 microns and was found to exhibit a maximum Faraday rotation of about 3300°/cm. (at 80° K. in a magnetic field of 7kOe). Although of scientific interest, a Faraday rotation of 3300°/cm. is of little immediate commercial significance when one compares this with the Faraday rotation of materials such as $Y_3Fe_5O_{12}$ which exhibits nearly as high or higher Faraday rotations at room temperatures, rather than 80° K.

SUMMARY OF THE INVENTION

In accordance with the present invention, there is now provided a magneto-optical readout process which employs a magnetic element having discrete areas which are magnetized, each of these areas comprising an inorganic crystalline material having a magnetically ordered crystal sublattice containing tetrahedrally coordinated divalent cobalt in an amount sufficient to provide, at certain specified wavelengths of electromagnetic radiation, giant magneto-optical effects. In accord with the present invention, it has been found that the above-described magnetic materials characteristically exhibit peak giant magneto-optical effects at one or more selected wavelengths of incident light typically having a wavelength within the range of from about 0.5 to about 2.5 microns.

The giant magneto-optical effects observed in magnetic materials used in the present invention are associated with the crystal field transitions arising from divalent cobalt located in the tetrahedral positions of the crystal sublattice. Thus, by subjecting an inorganic magnetic crystalline material having divalent cobalt in the tetrahedral positions of the crystal sublattice to polarized light having a wavelength corresponding to the crystal field transitions arising from divalent cobalt, giant magneto-optical effects can be obtained.

In accord with certain preferred embodiments of the present invention, the magnetic inorganic crystalline material selected for use is a magnetic spinel having divalent cobalt in at least 10% of the tetrahedral sublattice sites of the spinel crystal.

In accord with a further embodiment of the invention, the magnetic tetrahedrally coordinated divalent cobalt-containing materials are insulating magnetic materials having a specific resistivity at 25° C. of greater than about $10^4$ ohm-cm., and preferably greater than about $10^6$ ohm-cm.

In accord with other especially useful embodiments of the invention, there are provided various improved magneto-optical elements wherein the magnetic material used in such elements comprises the above-described tetrahedrally coordinated divalent cobalt-containing magnetic material. For example, in accord with the invention, there are provided magnetic recording elements, improved magnetic transducers and improved magnetic birefringent optical elements.

In accord with another embodiment of the invention, there is provided an improved thermomagnetic recording process using the above-described tetrahedrally coordinated divalent cobalt-containing magnetic materials.

Among the many advantages that may be derived from the present invention are the following:

Many of the magnetic crystalline materials useful in the present invention have a Curie temperature significantly higher than that of known prior-art materials, such as EuO, which exhibit large magneto-optical effects. For example, many of the magnetic materials useful in the present invention have been found to have a Curie temperature greater than about 200° K., and certain of these magnetic compounds have been found to have Curie temperatures near or above room temperature (i.e., 298° K.). Such relatively high Curie temperatures represent a substantial advance in the art because they eliminate or, at least, substantially reduce the problem of maintaining the magneto-optical materials at cryogenic temperatures.

A second advantage deriving from the use of the above-described magnetic materials is that many of these materials, because of the large magnitude of the magneto-optical effects which may be obtained, may be used in magnetic recording elements with a high signal-to-noise ratio.

A further advantage of the invention is that the magnetic materials used in the invention have potentially a very high packing density for the storage of information in the magnetic domains of the material, the packing density being limited, in principle, only by the size of the magnetic domains of the material and the diffraction-limited resolution of the optical readout beam of radiation.

Still another advantage of the invention is that it has been found that many of the tetrahedrally coordinated divalent cobalt-containing magnetic materials advantageously, for example, when hot-pressed, possess magnetic remanence aligned normal to the surface of the magnetic material, thus providing a maximum detectable magneto-optic effect in a beam of light directed normal to the surface of the magnetic material. These and other advantages of the invention will become apparent from the following description of the invention.

DESCRIPTION OF THE PREFERRED EMBODIMENTS

Figure 1A:
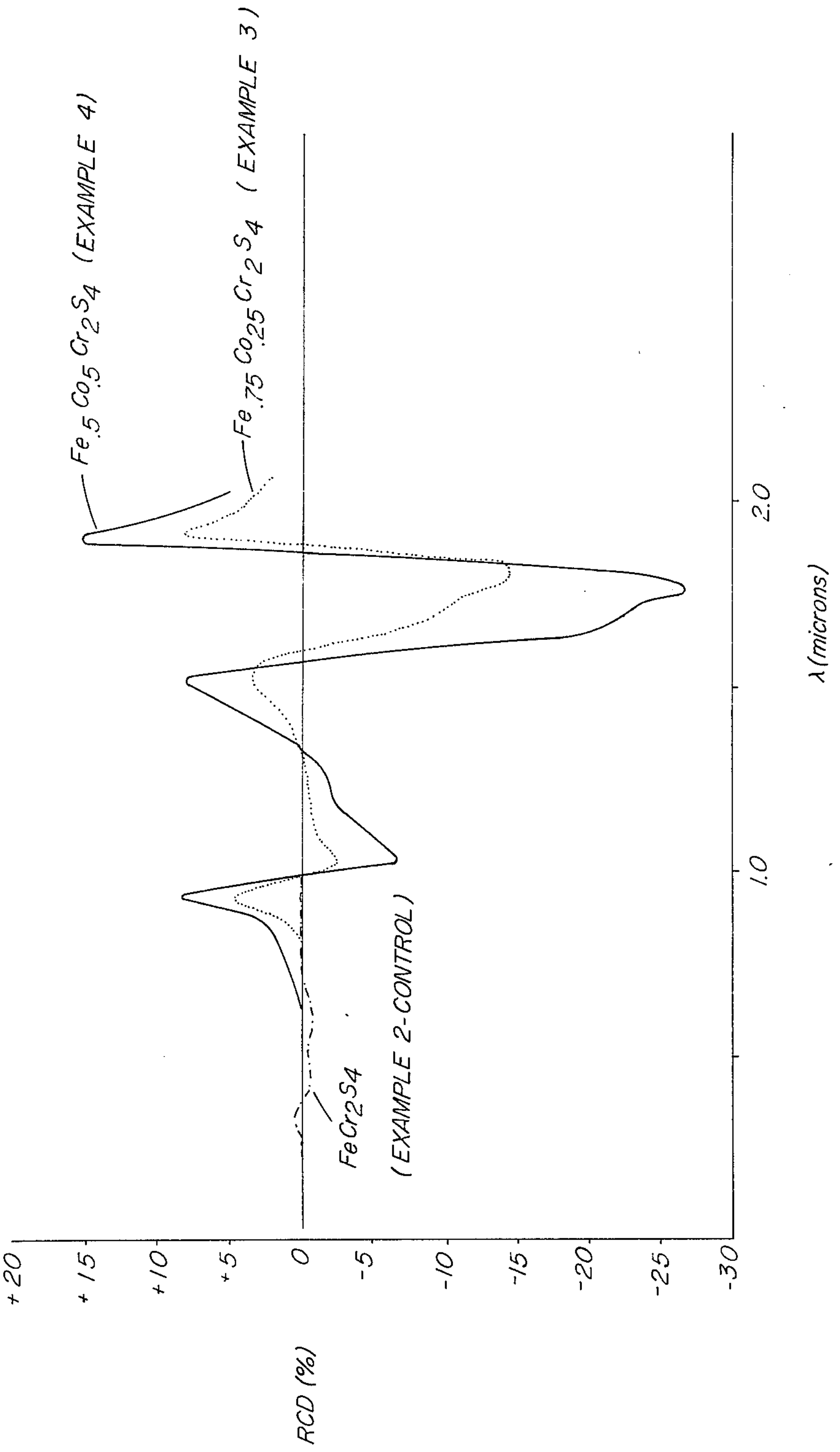
FIG. 1*a*, 1*b* and 2 are graphs illustrating the relationship of the giant magneto-optic effects obtained in certain exemplary inorganic magnetic crystalline materials used in the present invention as a function of the wavelength of an incident beam of polarized light.

The term "giant" magneto-optical effects as used herein is defined as large optical effects, such as a Faraday rotation greater than $10^{5}$°/cm. or a Kerr ellipticity greater than 0.25°, respectively. The magnetic materials used in the present invention typically exhibit giant magneto-optical effects having one peak or maximum for radiation having a wavelength within the range of from about 1.4 to about 2.5 microns, generally occurring at about 1.7 microns. Other peaks or maxima may also be exhibited for certain other selected wavelengths of radiation, typically within the range of from about 0.5 to about 1.4 microns. The wavelengths at which giant magneto-optical effects occur correspond to the crystal field transitions associated with divalent cobalt contained in the tetrahedral sublattice structure of the magnetic materials used in the invention.

The term "crystalline material" as used herein includes single crystals as well as polycrystalline materials, such as a hot-pressed unitary polycrystalline solid or a thin film of a polycrystalline material.

The term "tetrahedrally coordinated divalent cobalt" as used herein has reference to a crystalline material having within the crystal lattice structure thereof a crystal sublattice composed solely of primitive cells which contain an ion of divalent cobalt surrounded by four neighboring ions whose centers lie on the corners of a regular tetrahedron.

The term "magnetically ordered" tetrahedrally coordinated divalent cobalt as used herein means that the atomic moments or "spins" of the tetrahedrally coordinated divalent cobalt ions within the sublattice of the crystalline material spontaneously align themselves parallel to each other. Accordingly, magnetically ordered, tetrahedrally coordinated divalent cobalt-containing materials includes both ferrimagnetic and ferromagnetic materials.

The large magneto-optical effects which may be observed using the magnetic materials described herein at the particular wavelengths specified herein are completely unexpected. That is, prior to the present invention there has been no known correlation between the crystal field transitions of tetrahedrally coordinated divalent cobalt and the magneto-optical effects exhibited by magnetic materials containing tetrahedrally coordinated divalent cobalt. Although one would typically expect to find variations in the magnitude of magneto-optical effects obtained in any magnetic material depending on the particular wavelength of incident radiation employed, one would not expect to find intense peaks or maxima in the Kerr and other magneto-optic effects which have been noted in the cobalt-containing magnetic materials described herein. For example, in the previously referenced article by Carnall et. al. appearing in *Material Research Bulletin*, the largest Faraday rotation reported for $CoCr_2S_4$ is 3300°/cm. as measured at a wavelength of incident radiation of 4 microns whereas in accord with the present invention using a beam of incident radiation having a wavelength of 1.7 microns a Faraday rotation of $CoCr_2S_4$ greater than $10^{6}$°/cm. at 80° K. may be deduced from Kramers-Kronig and other analysis of the magneto-optical reflectance data obtained from hot-pressed samples of $CoCr_2S_4$. (The actual calculation of these extremely large Faraday rotation values is shown in the paper entitled "Magneto-Optical Properties of Ferrimagnetic $CoCr_2S_4$ in the Near Infrared" coauthored by R.K. Ahrenkiel, T.J. Coburn, and E. Carnall, Jr. which will appear in *IEEE Transactions on Magnetics*, March 1974 issue.)

The crystal field transition of tetrahedrally coordinated divalent cobalt in an inorganic crystalline material have been described extensively in the literature, for example, in articles by J. Ferguson, *J. Chem. Phys.* 32, 528 (1960) and H. A. Weakliem, *J. Chem. Phys.* 36, 2117 (1962). A particularly strong crystal field transition exhibited by divalent cobalt occurs at about 1.7 microns and has a spectral width greater than about 0.3 microns. This particular crystal field transition is designated as the $^4A_2(F)$ to $^4T_1(F)$ crystal field transition. This particular crystal field transition is quite strong in each of the inorganic magnetic compounds containing tetrahedral cobalt which thus far have been tested by applicant and is a reliable test of tetrahedrally coordinated divalent cobalt. Depending upon the particular host materials in which the tetrahedrally coordinated divalent cobalt is present, the $^4A_2(F)$ to $^4T_1(F)$ transition at about 1.7 microns may vary in wavelength by about 20 percent.

Another crystal field transition which has been found to occur in many of the tetrahedrally coordinated divalent cobalt-containing magnetic materials used in the present invention is the $^4A_2(F)$ to $^4T_1(P)$ crystal field transition which generally occurs in materials at about 0.625 microns. Another related transition observed in many of these cobalt-containing magnetic materials (and which is thought to involve the $^4A_2(F)$ to $^4T_1(P)$ crystal field transition which has been altered by the interaction between adjacent cobalt ions in the tetrahedral site) often occurs in materials much as cobalt chromium sulfide at about 1.0 micron. It should be noted, however, that the wavelength of these latter two crystal field transitions associated with tetrahedrally coordinated divalent cobalt have generally been found to be more dependent upon the particular host material in which the tetrahedrally coordinated divalent cobalt is present, and therefore there is a greater degree of variance in the particular wavelength at which the magneto-optical effects associated with these crystal field transitions are observed.

In general, it has been found that the cobalt-containing magnetic crystalline materials used in the present invention exhibit giant magneto-optical effects at a wavelength less than about 2.5 microns, generally within a range of from about 0.5 to about 2.5 microns. Of course, it will be appreciated, in view of the large number of tetrahedrally coordinated cobalt-containing compounds which may be used in accordance with the present invention, that it may well be possible to observe large magneto-optical effects at wavelengths much less than 0.5 microns or greater than 2.5 microns depending upon the particular host elements in which the tetrahedrally coordinated divalent cobalt is present.

Inasmuch as the giant magneto-optical effects observed in accord with the present invention depend upon the presence of tetrahedrally coordinated divalent cobalt and the associated crystal field transition thereof within an inorganic magnetic crystalline material, it is considered that a large number of other elemental materials may be present in the crystalline magnetic materials used in the present invention. Accordingly, the magnetic materials useful in the present invention includes a large number of tetrahedrally coordinated divalent cobalt-containing compounds and should not be limited to a particular class thereof.

Typical of the tetrahedrally coordinated divalent cobalt-containing compounds useful in the present invention are magnetic cobalt-containing chalcogenide spinel compounds having the following formula:

| Tetrahedral Sublattice Site | Octahedral Sublattice Site | |
|---|---|---|
| $\left[Co_x^{+2}M_z^{+2}N_{1-x-z}^{+3}\right]$ | $\left[N_{1+x+z-t}^{+3}B_t^{+3}Co_{1-x-z}^{+2}\right]$ | $Y_4^{-2}$ |

wherein

M is a metal including transition metals selected from Periods 2–6 of Groups IA, IIA, IIIA, IVA, IB–VIIB, and VIII of the Periodic Table of the Elements;

B is a transition metal selected from Periods 4–6 of Groups IB–VIIB and VIII of the Periodic Table of the Elements;

N is a metal selected from Group II*a* of the Periodic Table of the Elements or a transition metal as defined above;

Y is a chalcogen selected from the group consisting of oxygen, sulfur, selenium, tellurium, and mixtures thereof;

$x$ is a number greater than 0 and equal to or less than 1.0;

$z$ is a number equal to or greater than 0 and less than 1.0; and $t$ is a number equal to or greater than 0 and equal to or less than 2.0.

An especially useful class of the above-described tetrahedrally coordinated divalent cobalt-containing chalcogenide spinels are the spinels wherein Y in the above-noted structural formula is selected from the group consisting of sulfur, oxygen, or mixtures thereof and $0.10 \leq x \leq 1.00$.Compounds corresponding to these preferred materials have been found advantageous because many of these compounds are known to have a Curie temperature greater than about 200°K., and some have been found to have a Curie temperature within the range of about 298° K. to about 600° K. Therefore, the giant magneto-optical effects exhibited by these compounds may be employed while greatly reducing or completely eliminating the cryogenic requirements of these compounds. Moreover, it has been found when many of these preferred spinels are hot-pressed, the resultant polycrystalline unitary solids exhibit stable magnetic domains aligned in a direction normal to the surface thereof. This is particularly advantageous because it allows normal incidence readout which, at present, is not possible in many known magnetic materials which have a relatively large magneto-optical effect. For example, EuO which exhibits the largest known Kerr rotation of any known compound requires readout by incident light striking the surface at an angle of about 70°, rather than normal to the surface, because the magnetic domains of EuO are not aligned normal to the surface thereof.

A partial list of representative tetrahedral divalent cobalt-containing spinel compounds useful in the present invention includes the following compounds:

$Fe_{0.75}Co_{0.25}Cr_2S_4$ $CoFeRhO_4$ $Fe_{0.5}Co_{0.5}Cr_2S_4$ $CoCr_2S_4$

Figure 1B:
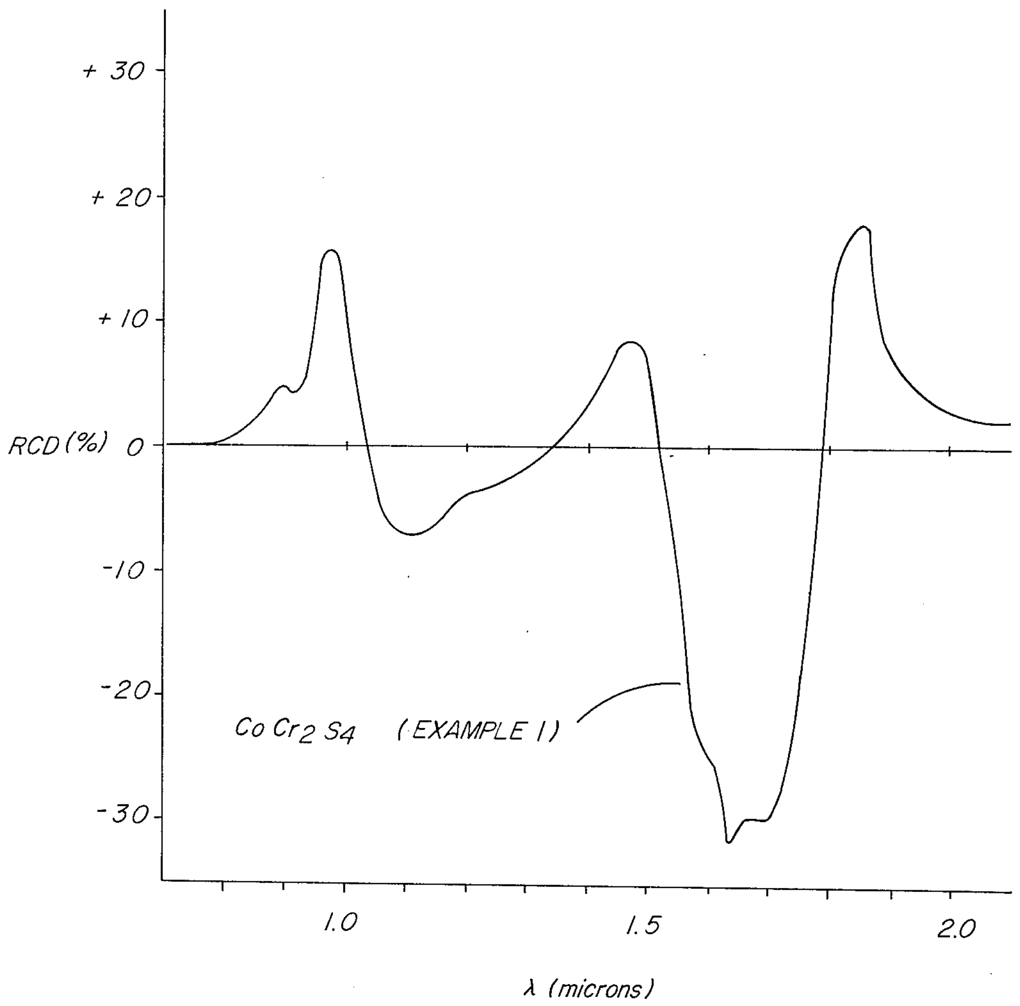
Figure 2:
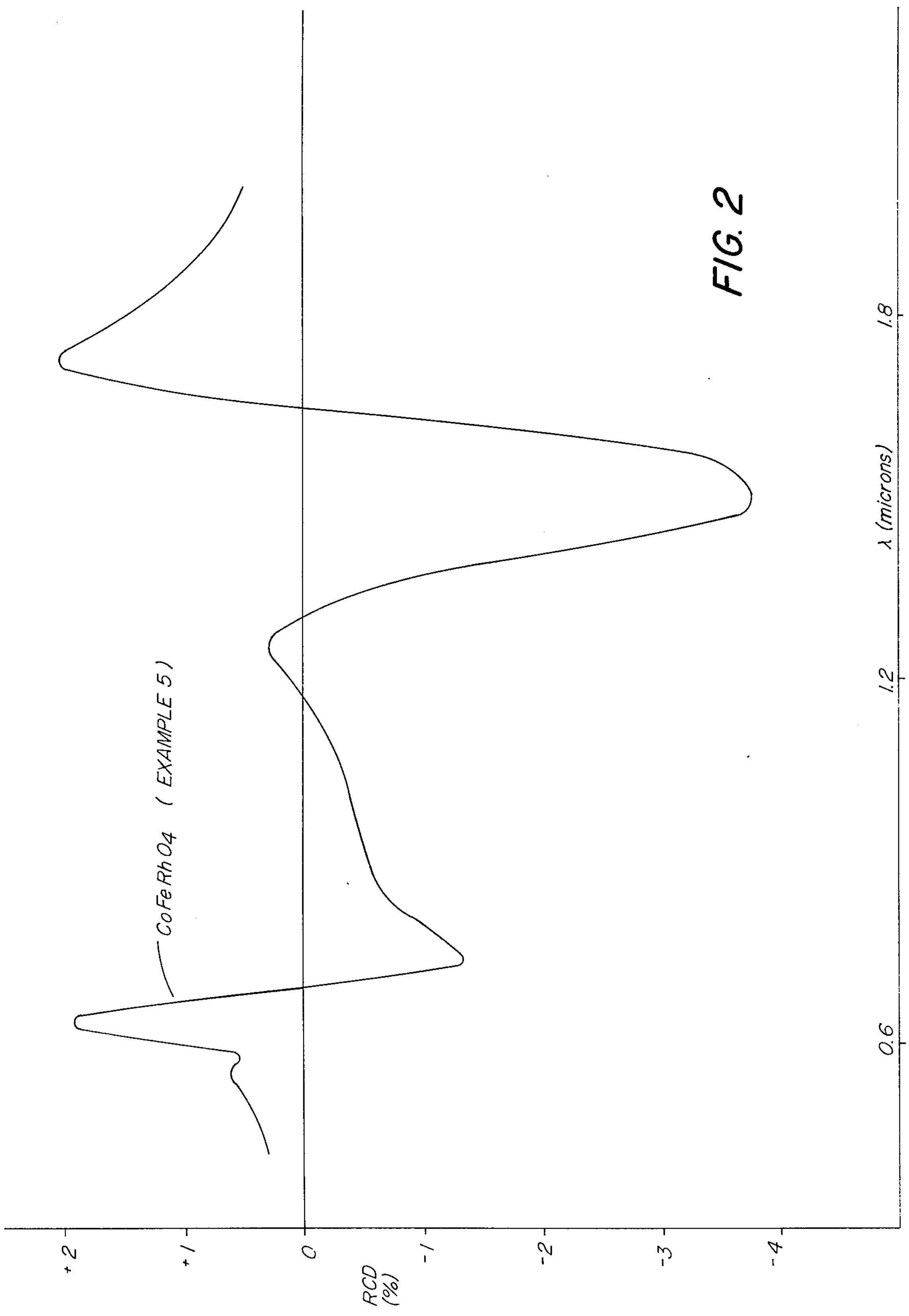

To illustrate the large magneto-optical effects which may be observed using the above-described tetrahedrally coordinated divalent cobalt-containing magnetic spinels, reference may be made to FIGS. 1*a*, 1*b*, and 2 attached hereto which show graphs of reflectance circular dichroism as a function of the wavelength of incident polarized light normal to the surface of a hot-pressed sample of each of the listed materials. The RCD values shown in FIGS. 1a, 1b and 2 are measured using an apparatus which allows one to measure the difference in reflectance coefficient between right and left-circularized polarized light reflected from a sample of the magnetic material to be tested.

Figure 3:
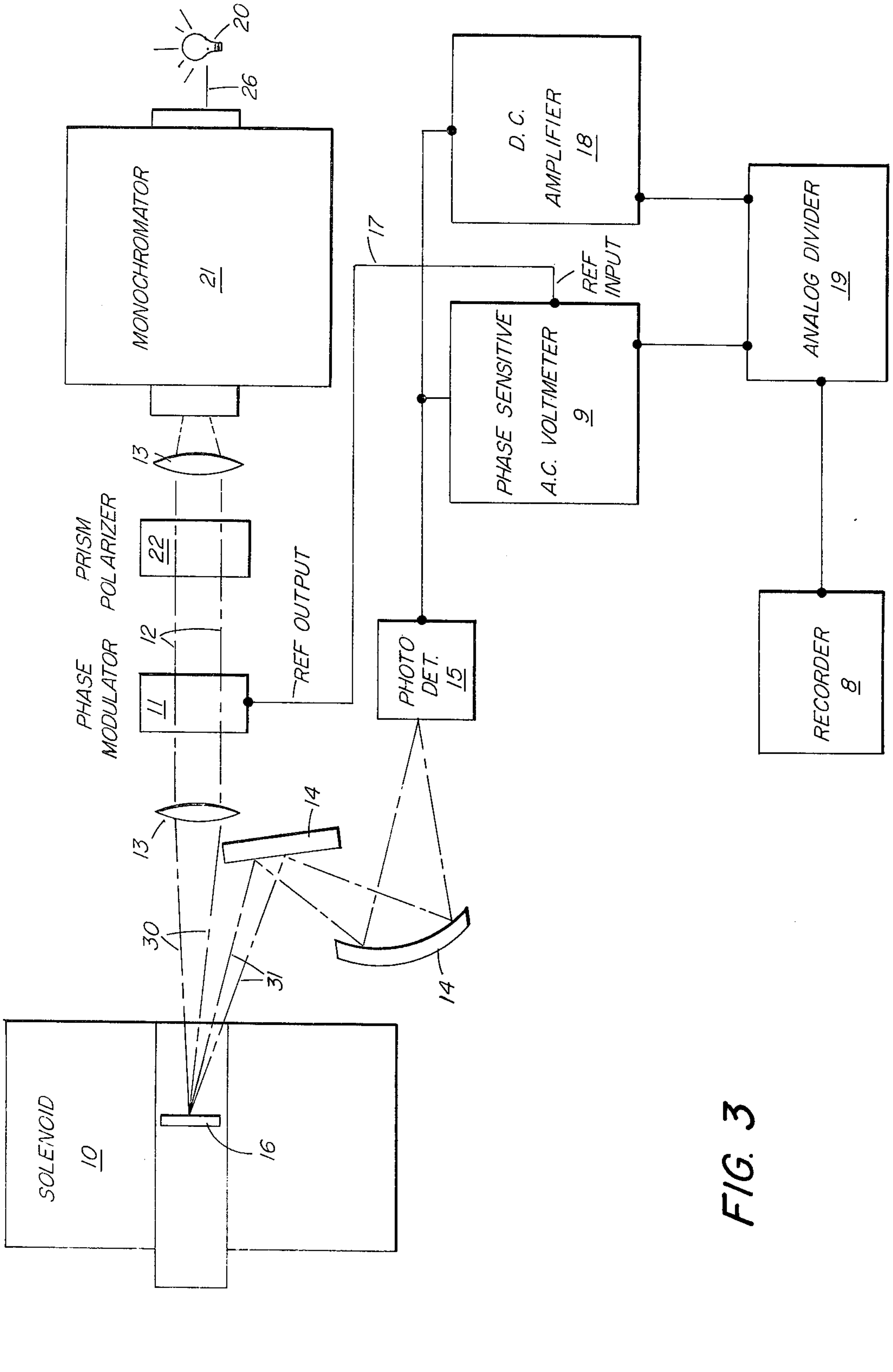
FIG. 3 represents, digrammatically, one apparatus which has been found useful in detecting the magneto-optical effects produced by the magnetic materials used in the present invention wherein polarized light and a reflectance mode of optical readout is used.

The apparatus actually used to measure the RCD values shown in the graphs of FIGS. 1a, 1b, and 2 is illustrated schematically in FIG. 3 attached hereto. This apparatus actually measures the quantity ΔR/R where the value ΔR/R is defined in accordance with equations (1) and (2) as follows:

$$RCD\ (\text{expressed in }\%) = 100\ \Delta R/R \quad (1)$$

$$\Delta R/R = 2(R^+ - R^-)/(R^+ + R^-) \quad (2)$$

where $R^+$ and $R^-$ are the reflectance coefficients for right and left circularly polarized light, respectively.

As noted earlier herein RCD values are directly related to Kerr ellipticity. This relationship may be expressed mathematically in equation (3) as follows:

$$RCD/100 = \Delta R/R = -4 \tan \phi_K \quad (3)$$

where $\phi_K$ is the Kerr ellipticity expressed in degrees. (Equation 3 is quite accurate so long as the angle $\phi_K$ is a fairly small angle less than about 20°. For further information regarding the derivation of equation (3) reference may be made to the article referred to earlier herein and entitled "Magneto-Optical Properties of Ferrimagnetic $CoCr_2S_4$ in the Near Infrared".)

Referring now to FIG. 3, a magneto-optical element 16, which has a specularly reflective surface and which is composed of the cobalt-containing magnetic materials described hereinabove is selected. Element 16 is mounted adjacent solenoid 10 such that the magnetic field from solenoid 10 orients the domains of element 16 parallel to light beam 30. This allows measurements of the polar Kerr effects in the so-called Faraday configuration. The field of solenoid 10 is reversible so that the magnetic domains of element 16 may be aligned paralled or anti-parallel to light beam 30.

The light phase modulator 11 is, for example, a Morvue Electronics Modulator, Model PEM-3 commercially available from Morvue Electronics, Tigand, Ore., for changing the polarization sense of incident plane-polarized light 12 from right to left-circular at some determined frequency. This is achieved by mechanically driving a fused birefringent silica element by contact with a vibrating quartz crystal. The apparatus used here operates at 50 KHz. The beam of monochromatic light 12 is produced by focusing light 26 from source 20 such as a tungsten lamp through monochrometer 21 such as a prism or grating monochromator and polarizer 22 such as a prism polarizer. The reflective surface of element 16 reflects the alternatively right and left-circularly polarized beam of monochromatic light 30 by means of focusing lenses 13 and mirrors 14 onto the active surface of a photodetector 15 such as a photomultiplier, lead sulphide detector or indium arsenide detector. Assuming the wavelength of light beam 30 corresponds to a crystal field transition of the cobalt-containing magnetic material of element 16, one can detect the change in polarization of reflected light beam 31 by measuring the large difference in amplitude (i.e. intensity) which exists between the right and left-circularly polarized components of reflected light beam 31. The light sensed by the photodetector 15 is amplitude modulated at the frequency of the modulator 11. The output of the photodetector is connected to a narrow-band, phase-sensitive AC voltmeter 9 such as a lock-in amplifier. The reference channel 17 of the phase-sensitive voltmeter 9 is connected to the modulator 11 which produces an output voltage which is in phase with the driven polarization element. Phase-sensitive voltmeter 9 then only records those AC signals which are at the modulator frequency and in phase with its driven element. This signal then is proportional to $R^+ - R^-$.

A low frequency or DC instrument 18 such as a DC amplifier is connected to the photodetector 15 and records the average sample reflection $\frac{1}{2}(R^+ + R^-)$. The outputs of the 50 KHz signal and the DC signal are then run into an analog divider circuit 19 (such as a Model 106A commercially available from Analog Devices Co.) to get the ratio (ΔR/R) (Eqn. 2). This signal is usually expressed in percent as RCD, rather than as a decimal number, and is recorded by recorder 8.

As indicated above FIG. 3 illustrates one particular apparatus for monitoring the magneto-optical effects, specifically RCD values, exhibited by the magnetic materials of the present invention using a reflection mode of optical readout. Such an apparatus or variation thereof could be used, for example, to detect the magnetization of discrete areas of a magnetic storage element in which digital information is stored in a magneto-optical memory material composed of the above-described cobalt-containing magnetic material. Of course, many types of reflectance mode readout apparatus different from that illustrated in FIG. 3 could be used to measure the magneto-optical effects produced by the materials used in the present invention depending upon the particular reflectance readout value desired, e.g. Kerr rotation, RCD, etc. and the particular manner or application in which the readout is to be employed.

Figure 4:
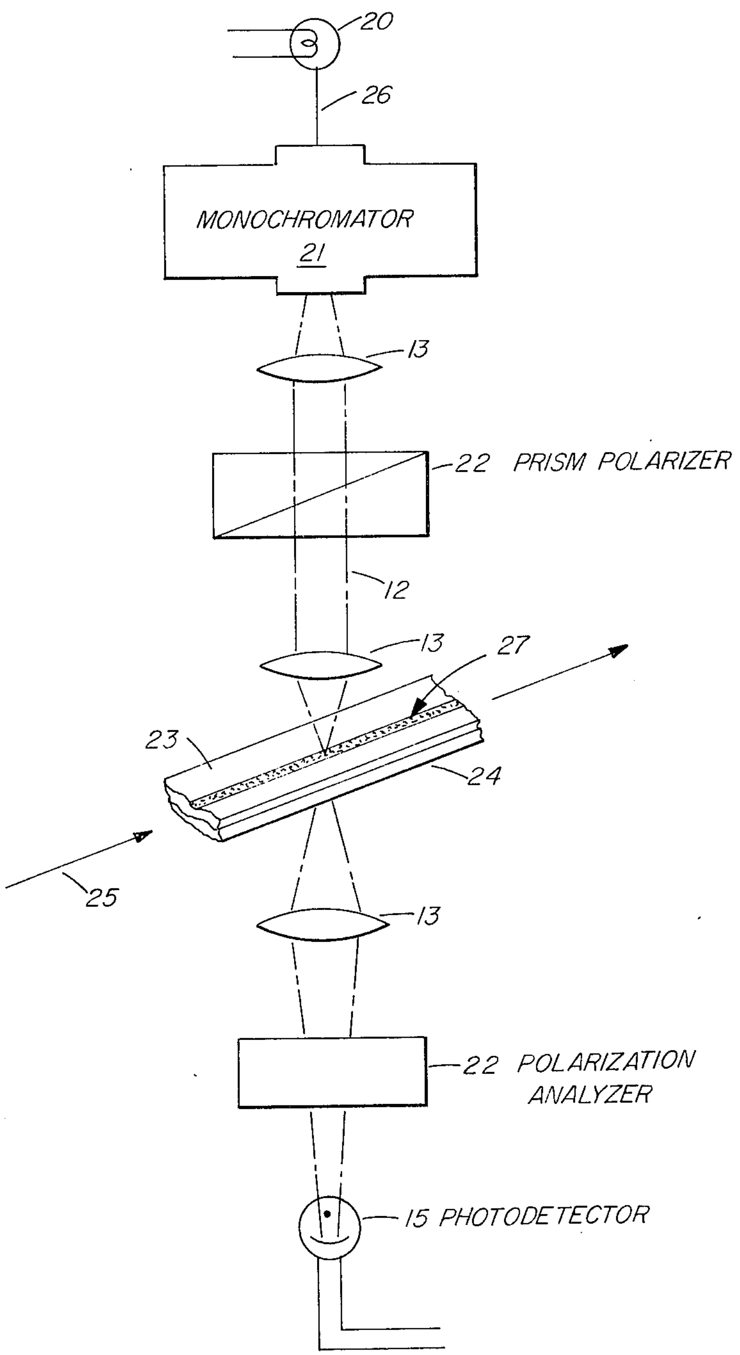
FIG. 4 represents, diagrammatically, an alternative arrangement which may be used to detect the magneto-optical effects produced by the magnetic materials used in the present invention wherein polarized light and a transmission mode of optical readout is used.

As suggested herein, the magnetic crystalline materials of the invention may also be employed in a magneto-optical system wherein a transmission mode of optical readout is employed. Referring now to FIG. 4, there is illustrated schematically a typical apparatus which may be used in a transmission mode of readout to detect the rotation in the plane of polarization of a beam of plane polarized light transmitted through a magnetized thin layer of the cobalt-containing magnetic material used in the invention. In FIG. 4, light beam 26 produced by light source 20 upon passing through monochrometer 21, lens 13 and polarizer 22 is converted to plane polarized light beam 12. Light beam 12 is then directed by lens 13 through the thin layer 23 of cobalt-containing magnetic material and optional support 24 for layer 23. Light beam 12 is chosen to have a wavelength corresponding to a crystal field transition of tetrahedrally coordinated divalent cobalt, for example, a wavelength within the range of from 0.5 to 2.5 microns. Thin layer or film of magnetic material 23 has a thickness on the order of about 10,000 angstroms or less such that it is at least partially transparent to light beam 12.

Assuming now that layer 23 is, for example, a magnetic recording element such as a magnetic tape or a video disk, which is moving in the direction indicated by arrows 25 relative to light beam 12, then light beam 12 effectively becomes used to scan layer 23. In such case, light beam 12 may be focused, for example, on a particular recording track 27 of layer 23 and thus will undergo a rotation of its plane of polarization corresponding to the direction of magnetization within each magnetic domain of track 27. The rotational modulation produced in light beam 12 passing through track 27 may then be measured using an appropriate lens system 13 together with polarization analyzer 22 and photodetector 15 as is well-known in the art. As a result, by measuring the electronic signal output of photodetector 15, one can determine the sense of the Faraday rotation produced in light beam 12 as a result of passing through track 27. Therefore, one can determine the magnetic domain orientation within each domain of track 27 and thereby "readout" whatever information has been magnetically stored therein.

As indicated in FIG. 4, the layer of magnetic material 23 may optionally be mounted on support 24. Of course, layer 23 may be self-supporting, thereby eliminating the need for support 24. However, in view of the thinness of layer 23, it is usually desirable to apply the material as a thin film on a suitable support. In such a case, support 24 should be carefully selected so that its optical properties do not interfere with the rotational modulation of light beam 12.

Having described the particular magnetic materials useful in the present invention and illustrated both an exemplary reflection and transmission mode of optical readout employing these materials, some of the various applications of the invention using certain of these materials and the advantages thereof may be illustrated.

Briefly, many uses have been proposed in the art employing optical readout of a magnetic material. In most of these applications, although not all, information is stored in individual magnetic domains within the magnetic material. Any method of magnetic recording can be used to store information within the magnetic domains of such materials.

One method of magnetic recording which has been proposed for use is commonly referred to as Curie-point writing or thermomagnetic recording in which incident radiation is absorbed in a magnetically saturated film, thereby heating the film. Strongly illuminated regions of the film are heated above the Curie-point, forcing these regions into the paramagnetic state. Upon cooling, either in an applied magnetic field or in a dipole field of the surrounding magnetic material, the film will return to the magnetic state, but with a variation in the direction of magnetization that is related to the incident light pattern. (That is, those discrete regions of the film which have been heated above the Curie point will return to the magnetic state having the individual magnetic domains of these regions magnetized in the direction of the magnetic field applied during cooling.) The field applied during cooling is generally selected to have a field strength too low to significantly alter the magnetization of the non-heated regions of the saturated magnetic film.

As will be apparent from the above description of thermomagnetic recording, this method of magnetic recording is particularly suited for use with magnetic insulating materials because these materials have a low thermal conductivity and therefore require a minimal amount of energy to accomplish differential heating of adjacent areas of the magnetic material. Accordingly, many if not most of the cobalt-containing magnetic materials described hereinabove which have an electrical resistivity greater than about $10^4$ ohm-cm. and generally $10^6$ ohm-cm. or more, when used in a thermomagnetic recording process, will provide an improved thermomagnetic recording process. Of course, as suggested earlier herein, the cobalt-containing materials described herein are also particularly adapted for use in the improved thermomagnetic recording process of the present invention because of the Curie temperatures many of these magnetic materials possess. That is, many of these magnetic materials have a Curie temperature above about 200° K. and preferably less than about 600° K., so that extreme operating temperatures are not required either to maintain the magnetic material below its Curie temperature, so that the information stored therein is not "erased", or to raise the magnetic material above its Curie temperature, so that new information may be "stored" in the magnetized material.

As a result of Curie-point writing, there is produced a magnetic film wherein the unexposed, unheated regions of the film have magnetic domains aligned all in one direction and wherein the magnetic domains of the heated, exposed regions of the film are aligned in another direction, the direction of alignment in any one magnetic domain corresponding to a particular piece of intelligence or information. This stored intelligence or information may then be optically read out of the film in accord with the optical readout process of the invention by light passing through the film (the Faraday effect) or by light reflected from the film (the Kerr effect), as illustrated in FIG. 3 and 4.

Typically, information stored on the film is read out optically using a polarized light beam and analyzers to sense the different directions of magnetization within discrete magnetic domains of the film. However, by using a holographic optical readout, it is not necessary to employ polarized light. (To date, most optical readout systems employing magnetic materials use the so-called "bit-by-bit" method of readout which uses polarized light as illustrated in FIG. 3 and 4. Thus, in describing the optical readout method of the present invention, the term "polarized" light has often been used hereinabove. However, because optical readout in accord with the present invention may be accomplished holographically using unpolarized light, the invention should not be limited to readout requiring the use of a polarized beam of incident radiation.) A holographic method of readout is illustrated, for example, in the article "Materials for Magneto-Optic Memories" by Cohen et al., referred to hereinabove and incorporated by reference herein.

Among the many devices and elements advantageously employing the present invention are various magnetic recording elements. For example, the magnetic materials used in the present invention easily lend themselves to magnetic recording elements such as digital memory elements, video disks, magnetic recording tapes and the like, wherein information stored in the magnetic domain of the material (such as by thermomagnetic recording as described above) is read out optically using either a transmission mode or reflectance mode of readout such as described hereinabove with reference to FIG. 3 and 4. In such applications, one advantageously employs a suitable support bearing a layer of a magnetic material as described herein having a relatively high coercivity greater than about 500 oersteds and a remanence of the magneto-optical effect greater than about two-thirds the saturation value. The coercivity and remanence of the magnetic materials described herein may readily be varied. For example, in the preferred spinels described hereinabove, one may vary the remanence and coercivity thereof merely by changing the amounts and kinds of elements contained in the spinel in addition to the tetrahedrally coordinated divalent cobalt. For example, cobalt chromium sulfide has a relatively high coercivity on the order of about 4kOe and a remanence of the magneto-optical effect of about 90 percent the saturation value.

The magnetic materials described herein may also advantageously be employed in other types of apparatus and processes such as improved magnetic transducer and other magnetic field measuring elements. For example, improved magnetic transducers containing the magnetic materials described herein may be used in a magnetic playback head which employs a magneto-optical readout. Such playback devices using magneto-optical readout are extremely advantageous because the magnetic material can be deposited in thin films, thereby making it possible to resolve short recorded wavelengths; furthermore, the track widths used are limited only by the diffraction limits of the optical readout system. Magnetic playback heads employing optical readout have previously been suggested in the art, but commercialization thereof has been seriously impeded by the lack of useful magnetic materials exhibiting large magneto-optical effects. However, by using the magnetic materials described herein, it is considered that commercialization of such devices can be significantly accelerated. If the magnetic materials used in the present invention are employed in an improved magnetic transducer in a magnetic playback head, it would be desirable to select materials having a relatively low coercivity of less than about 1 oersted. Other improved magnetic field measuring elements employing the cobalt-containing magnetic materials described herein include Hall effect devices and flux gap magnetometers.

The cobalt-containing magnetic materials described herein are also particularly useful in improved magnetic birefringent optical elements which comprise in inorganic crystalline magnetic material. Birefringent optical elements include devices such as isolators, rotators, modulators, light switches and the like. For further details and information regarding such devices, reference may be made to *Magnetic Properties of Materials*, edited by Jan Smit, published by McGraw Hill, at p. 196 (1971).

As set forth earlier herein, the magnetic materials used in the present invention have been found especially advantageous when "hot-pressed". Hot-pressing is a method of densification wherein an initial starting powder comprising the material to be hot-pressed is subjected to heat and pressure to form a polycrystalline unitary solid having extremely high density generally at least 99 percent of theoretical density. Certain hot-pressed spinel powders, when ground and surface-polished, are known to provide useful infrared transparent optical elements having magnetic properites. (In this regard, one may refer to Carnall, Jr., et al., U.S. patent application Ser. No. 181,992 noted earlier herein, which teaches that certain chromiumcontaining ferrimagnetic spinel powders, such as cobalt chromium sulfide, may be hot-pressed to obtain infrared transparent polycrystalline solids.) However, as noted previously, prior to the present invention, it was not known that such hot-pressed spinel materials were capable of providing giant magneto-optical effects.

The method of hot-pressing certain chalcogenide spinel powders described in U.S. patent application Ser. No. 181,992 may also be applied to many of the tetrahedrally coordinated divalent cobalt-containing magnetic materials described herein, especially the spinels, to provide elements which when polished are found to be particularly advantageous in the optical readout process of the present invention. By hot-pressing the tetrahedrally coordinated divalent cobalt-containing magnetic crystalline materials used herein and polishing the resultant hot-pressed elements, it has been found unexpectedly that the magnetic domains residing at the surface of the resultant hot-pressed elements are aligned in a direction normal to the surface thereof. Moreover, these hot-pressed elements exhibit high magnetic remanence and coercivity in the surface region. The remanence or the magnetic "hardness" of the hot-pressed spinel material in the surface region is particularly important and unexpected because one would expect the polar remanent magnetization at the surface to be small in a spinel material which has a cubic crystal lattice.

When hot-pressing is employed to provide magnetic elements useful in the present invention, it has generally been found that good results are obtained when hot-pressing is effected at a pressure of at least about 4,000 p.s.i. and a temperature equal to or slightly below the decomposition temperature of the particular powder starting material selected. These hot-pressed elements may be prepared using hot-pressing times varying from about 1 to 25 min. to less than about 3 hr. The temperatures typically employed in hot-pressing, for example, the spinel powders used in the present invention, generally range from about 400° to about 1200°C. The pressures typically employed in hot pressing, for example, these same spinel powders, generally range from about 4000 to about 75,000 p.s.i. A particularly useful apparatus which may be used to prepare hot-pressed materials useful in the present invention is described in Carnall, Jr., U.S. Pat. No. 3,476,690 issued Nov. 4, 1969 and illustrated in FIGS. 2–4 thereof, the relevant disclosure of said patent hereby incorporated herein by reference thereto.

The initial starting powder material used to prepare the hot-pressed magnetic materials useful in accord with certain embodiments of the present invention, may be prepared by a number of known techniques. One especially useful such preparatory method is described in Pearlman et. al., U.S. patent application Ser. No. 182,128 entitled "Chalcogenide Spinel Powders", filed Sept. 20, 1971.

The following examples are presented to further illustrate the present invention.

Example 1

This example relates to the giant magneto-optical properties exhibited by the magnetic spinel cobalt chromium sulfide. The cobalt chromium sulfide spinel materials which are used in this example consist of a series of polycrystalline unitary solid disks which are approximately 1 cm. in diameter and vary from 40 microns to 1 mm. thick. These disks are prepared by hot-pressing a finely-divided cobalt chromium sulfide spinel powder at a temperature of about 900°C. and at a pressure of about 50,000 p.s.i. The surface of each disk is polished to provide good optical reflection characteristics.

One of the above-described hot-pressed cobalt chromium sulfide disks is magnetized and tested for giant magneto-optical effects using a reflectance mode of optical readout apparatus identical to that illustrated in FIG. 3 to measure the reflectance circular dichroism. The test is conducted by maintaining the hot-pressed cobalt chromium sulfide disk at about 80°K which is below its Curie temperature of about 230°K. The RCD measurements for the hot-pressed cobalt chromium sulfide disk are made using a right and left-circular polarized incident beam of electromagnetic radiation having a wavelength ranging from about 0.7 to about 2.1 microns. During the test, the hot-pressed disk is maintained in a magnetic field of about 14.7 kiloersteds which is produced by solenoid 10 shown in FIG. 3. The results of the test are shown in FIG. **1*b* which is a graph of the RCD signal as a function of the wavelength of the incident beam of polarized light. Peak RCD signals of about 30 percent are present at a wavelength of about 1.7 microns. Another peak RCD signal is present at about 1.0 micron. These peak giant magneto-optical effects present at 1.0 and 1.7 microns are associated with the crystal field transitions of tetrahedrally coordinated divalent cobalt present in cobalt chromium sulfide. By reversing the magnetic field of solenoid 10 in the apparatus shown in FIG. 3**, reversal of the magnetic domains in the hot-pressed cobalt chromium sulfide sample also occurs so that the sign (i.e., positive or negative) of the RCD value is inverted. That is, a plus RCD value becomes a negative RCD value. Accordingly, the total change in the RCD signal which occurs in the hot-pressed cobalt chromium sulfide disk using plane polarized light having a wavelength of about 1.7 microns is about 60 percent.

Figure 5:
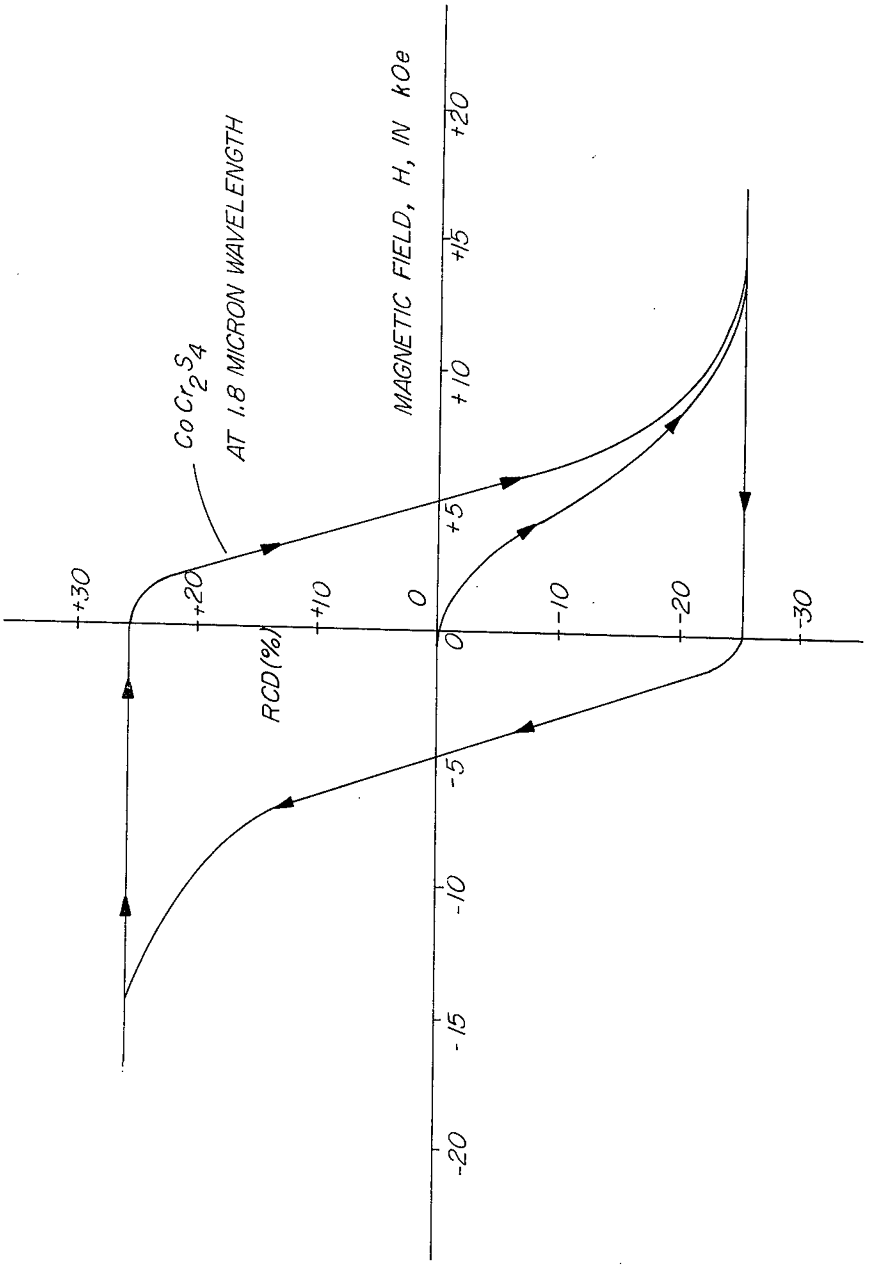
FIG. 5 is a RCD hysteresis graph for $CoCr_2S_4$.

Several additional hot-pressed cobalt chromium sulfide disks having a size similar to that described above are prepared as described above and subjected to additional tests. FIG. 5, for example, shows the RCD hysteresis at one particular surface area of a hot-pressed cobalt chromium sulfide disk as the magnetic field is varied in direction and intensity as shown in FIG. 5. The sample surface area of the disk which is used to obtain the RCD hysteresis plot shown in FIG. 5 is approximately 0.5 mm. by about 5 mm. which corresponds to the focused image area of the particular monochromator slit which is used to obtain the values shown in FIG. 5. Of course, a RCD hysteresis graph for a much smaller image area could be obtained by using a collimated light source such as a laser which may be focused, in the limit, to a surface area which corresponds to the diffraction limit of the incident laser beam. For example, the diffraction limit of an incident laser beam having a wavelength of 1.7 microns is a circular spot of light approximately 3–4 microns in diameter so that a cobalt chromium sulfide magnetic material used in a magnetic recording element would have a minimum achievable storage area approximately equal to a 4 micron diameter circle. The remanence which is calculated from hysteresis graphs similar to FIG. 5 for several different samples of hot-pressed cobalt chromium sulfide disks is found to be about 1.0 in several samples and in all samples tested is greater than about 0.95. These remanences are measured at a temperature of 80°K. The remanences of several other hot-pressed cobalt chromium sulfide disks which are tested over a temperature range of from 80° to 200°K. remains greater than 0.9. The coercivity in all hot-pressed cobalt chromium sulfide disks tested is quite high and is within the range of from about 4.5 to about 5.0 kOe.

Figure 6:
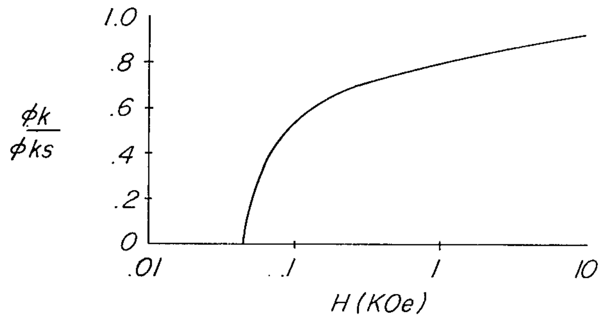
FIG. 6 is a graph of the ratio of Kerr ellipticity, $\phi_K$, to saturation ellipticity, $\phi_{KS}$, versus applied magnetic bias field, H, for $CoCr_2S_4$.

In FIG. 6, the Kerr ellipticity, $\phi_K$, relative to the saturation value, $\phi_{KS}$ at 1.7 microns is measured at 185°K. for a hot-pressed cobalt chromium sulfide disk (prepared as described above) which has been heated to about 240°K and then has been cooled through its Curie temperature to 185°K at a given magnetic bias field, H, varying from about 0.01 to about 10 kOe. The induced ellipticity is greater than 0.7 of the saturated value for fields greater than about 300 gauss. From the graph of FIG. 6, it can be concluded that if a cobalt chromium sulfide hot-pressed material is used, for example, as a digital memory element, the operating magnetic bias field should be larger than about 300 gauss.

EXAMPLES 2–4

In these examples, three additional hot-pressed spinel disks are prepared in a manner similar to that described in Example 1 and are evaluated for RCD values in an apparatus similar to that illustrated in FIG. 3. The first hot-pressed disk evaluated, i.e., Example 2, is actually a control element outside the scope of the present invention. The hot-pressed disk of Example 2 contains no tetrahedrally coordinated divalent cobalt and consists solely of a hot-pressed spinel powder of $FeCr_2S_4$. As shown in the RCD graphs of FIG. 1*a*, the hot-pressed $FeCr_2S_4$ disk of Example 2 shows no giant magneto-optical effect within the visible range of the spectrum (only very small RCD values being capable of measurement in the visible range of the spectrum) and completely unobservable magneto-optical effects in the near infrared portion of the spectrum, i.e., wavelengths extending from about 0.8 microns and above. This hot-pressed $FeCr_2S_4$ disk of Example 2 demonstrates the very small magneto-optical effects obtained in a magnetic spinel material which does not contain tetrahedrally coordinated divalent cobalt in the crystal structure thereof.

Next, as Example 3, 25 mole percent divalent cobalt is added to the $FeCr_2S_4$ and goes into a tetrahedral sublattice site thereof so that the hot-pressed disk of Example 3 is composed of the compound $Fe_{0.25}Co_{0.25}Cr_2S_4$. The fact that the cobalt is in a tetrahedral sublattice site of this compound may be confirmed by conventional x-ray diffraction measurements and optical reflectivity measurements known in the art. The hot-pressed disk of Example 3 is then tested in the apparatus of FIG. 3. As illustrated in the graph of FIG. 1*a*, the addition of 25 mole percent cobalt produces giant magneto-optical effects as evidenced by the large RCD signals shown for Example 3 in FIG. 1*a*.

In Example 4, 50 mole percent divalent cobalt is added to the $FeCr_2S_4$ control of Example 2 so that the hot-pressed disk of Example 4 is composed of $Fe_{0.5}Co_{0.5}Cr_2S_4$ with substantially all of the cobalt in a tetrahedral sublattice site. The disk is of Example 4 is then tested in the apparatus of FIG. 3 to obtain the RCD graph shown in FIG. 1*a*. As shown in FIG. 1*a*, the addition of 50 mole percent of tetrahedrally coordinated divalent cobalt into the $FeCr_2S_4$ material of Example 2 produces an even larger RCD signal than is obtained in Example 3. The peak RCD signal for Example 4 is about −27 percent at a wavelength of about 1.8 microns which corresponds to the crystal field transition of tetrahedrally coordinated divalent cobalt at 1.7 microns.

In all of the above cases, i.e., Examples 2–4, the RCD values illustrated in FIG. 1a are obtained at temperatures of about 80°K. which is well below the Curie temperatures of each of these materials, the Curie temperature of each of the materials shown in Examples 2–4 falling within the range of from about 190° to about 220°K.

Figures 7A, 7B:
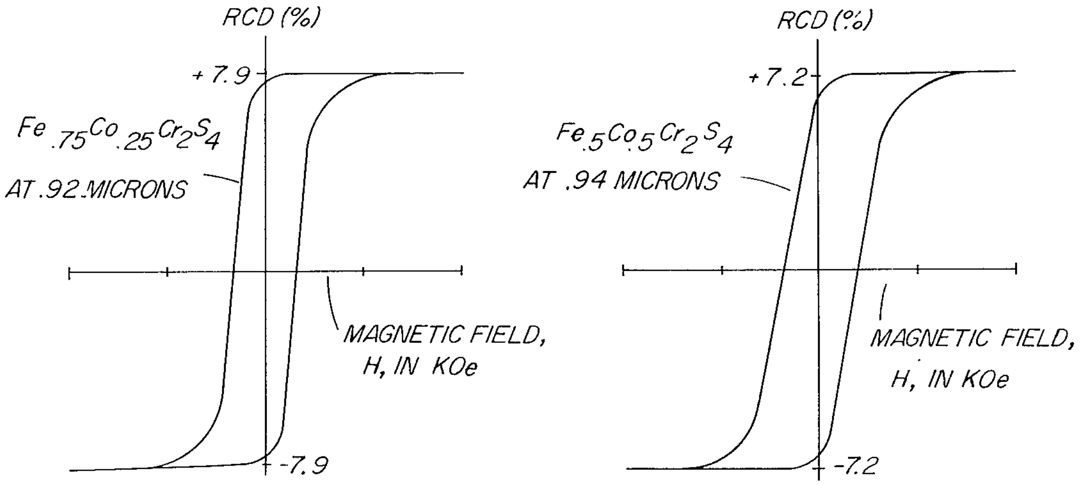
FIG. 7*a* and 7*b* are RCD hysteresis graphs for $Fe_{0.75}Co_{0.25}CrS_4$ and $Fe_{0.5}Co_{0.5}CrS_4$.

In FIGS. 7*a* and 7*b*, RCD hysteresis graphs of the materials of Examples 3 and 4, namely hot-pressed $Fe_{0.75}Co_{0.25}$ $Cr_2O_4$ and $Fe_{0.5}Co_{0.5}Cr_2O_4$, are illustrated using the same temperature conditions noted above. These RCD hysteresis graphs are obtained using incident light having a wavelength of about 1.7 micron.

EXAMPLE 5

In FIG. 2, the RCD of a hot-pressed magnetic spinel disk of $CoFeRhO_4$ prepared in a manner similar to that described in Example 1 is plotted using the apparatus shown in FIG. 3. The RCD values are obtained at room temperature (about 295°K.) and in a magnetic field of 14.7 kilooersteds. The Curie temperature of $CoFeRhO_4$ is about 350°K. An RCD signal of about 4 percent is observed at a wavelength of about 1.5 microns, and an RCD signal of about 2 percent is seen at a wavelength at about 0.63 microns. These peaks are associated with the crystal field transitions of tetrahedrally coordinated divalent cobalt contained in $CoFeRhO_4$. The peak at 0.63 microns is particularly advantageous for information storage with a helium-neon gas laser which exhibits an output laser beam at a wavelength of about 0.633 microns. In this regard, using a helium-neon gas laser the minimum achieveable storage area in a layer of magnetic material containing $CoFeRhO_4$ would be approximately equal to a 1.25 micron diameter circle.

The invention has been described in detail with particular reference to preferred embodiments thereof, but, it will be understood that variations and modifications can be effected within the spirit and scope of the invention.

We claim:

1. A magneto-optical readout process wherein electromagnetic radiation is used to determine the direction of magnetization within discrete areas of a magnetic element, said process comprising:

a. providing a magnetic element having discrete areas which are magnetized, each of said areas comprising an inorganic crystalline material having a magnetically ordered crystal sublattice containing tetrahedrally coordinated divalent cobalt in an amount sufficient to provide a Kerr ellipticity greater than 0.25°, b. exposing at least one of said discrete areas to radiation having a wavelength corresponding to a crystal field transition of said cobalt, and c. detecting the change in polarization of said radiation caused by said cobalt to determine the direction of magnetization within said discrete area which has been exposed.

2. A magneto-optical readout process as defined in claim 1 wherein said radiation has a wavelength within the range of from about 0.5 to about 2.5 microns.

3. A magneto-optical readout process as defined in claim 1 wherein said crystalline material comprises divalent cobalt in at least 10 percent of said tetrahedral sublattice sites.

4. A magneto-optical readout process as defined in claim 1 wherein said radiation is polarized and has a wavelength within the range of about 0.5 to about 2.5 microns.

5. A magneto-optical readout process wherein electromagnetic radiation is used to determine the direction of magnetization within discrete areas of magnetic element, said process comprising:

a. providing a magnetic element having discrete areas which are magnetized, each of said areas comprising an inorganic crystalline material having a magnetically ordered crystal sublattice containing tetrahedrally coordinated divalent cobalt in an amount sufficient to provide a Kerr ellipticity greater than 0.25°, b. exposing at least one of said discrete areas to electromagnetic radiation having a wavelength within the range of from about 0.5 to about 2.5 microns, and c. detecting the change in polarization of said radiation caused by said cobalt to determine the direction of magnetization within said discrete area which has been exposed.

6. A magneto-optical readout process wherein electromagnetic radiation is used to determine the direction of magnetization within discrete areas of a magnetic element, said process comprising:

a. providing a magnetic element having discrete areas which are magnetized, each of said areas comprising an inorganic magnetic chalcogenide spinel having the following formula:

| Tetrahedral Sublattice Site | Octahedral Sublattice Site | |
|---|---|---|
| $\left[Co_x^{+2}M_z^{+2}N_{1-x-z}^{+3}\right]$ | $\left[N_{1+x+z-t}^{+3}B_t^{+3}Co_{1-x-z}^{+2}\right]$ | $Y_4^{-2}$ |

wherein

M is a metal including transition metals selected from Periods 2–6 of Groups IA, IIA, IIIA, IVA, IB–VIIB, and VIII of the Periodic Table of the Elements:

B is a transition metal selected from Periods 4–6 of Groups IB-VIIB and VIII of the Periodic Table of the Elements;

N is a metal selected from Group II*a* of the Periodic Table of the Elements or a transition metal as defined above;

Y is a chalcogen selected from the group consisting of oxygen, sulfur, selenium, tellurium, and mixtures thereof;

$x$ is a mumber greater than 0.10 and equal to or less than 1.0;

$z$ is a number equal to or greater than 0 and less than 1.0; and $t$ is a number equal to or greater than 0 and equal to or less than 2.0, b. exposing at least one of said discrete areas to electromagnetic radiation having a wavelength corresponding to a crystal field transition of tetrahedrally coordinated divalent cobalt, and c. detecting the change in polarization of said radiation caused by said cobalt to determine the direction of magnetization within said discrete area which has been exposed.

7. A process as defined in claim 6 wherein said radiation is polarized and has a wavelength within the range of from about 0.5 to about 2.5 microns.

8. A process as defined in claim 6 wherein $0.10 \leq x \leq 1.0$.

9. A process as defined in claim 6 wherein said spinel has a Curie temperature greater than about 200°K.

10. A process as defined in claim 6 wherein said spinel has a Curie temperature greater than about 298°K and less than about 600°K.

11. A process as defined in claim 6 wherein said spinel is selected from the group consisting of $Fe_{0.75}Co_{0.25}CrS_4$, $Fe_{0.5}Co_{0.5}CrS_4$, $CoCr_2S_4$, and $CoFeRhS_4$.

12. A process as defined in claim 6 wherein said magnetic material comprises a hot-pressed magnetic chalcogenide spinel.

13. A process as defined in claim 6 wherein the change in polarization of said radiation is detected using a reflectance mode of optical readout.

14. A process as defined in claim 6 wherein the change in polarization of said radiation is detected using a transmission mode of optical readout.

15. A magneto-optical readout process wherein electromagnetic radiation is used to determine the direction of magnetization within discrete areas of a magnetic element, said process comprising:

a. providing a magnetic element having discrete areas which are magnetized, each of said areas comprising an inorganic magnetic chalcogenide spinel having the following formula:

| Tetrahedral Sublattice Site | Octahedral Sublattice Site | |
|---|---|---|
| $\left[Co_x^{+2}M_z^{+2}N_{1-x-z}^{+3}\right]$ | $\left[N_{1+x+z-t}^{+3}B_t^{+3}Co_{1-x-z}^{+2}\right]$ | $Y_4^{-2}$ |

wherein

M is a metal including transition metals selected from periods 2–6 of Groups IA, IIA, IIIA, IVA, IB–VIIB, and VIII of the Periodic Table of the Elements;

B is a transition metal selected from Periods 4–6 of Groups IB–VIIB and VIII of the Periodic Table of the Elements;

N is a metal selected from Group II*a* of the Periodic Table of the Elements or a transition metal as defined above;

Y is oxygen or sulfur;

$x$ is a number greater than or equal to 0.10 and less than or equal to 1.0;

$z$ is a number equal to or greater than 0 and less than 1.0; and $t$ is a number equal to or greater than 0 and equal to or less than 2.0, b. exposing at least one of said discrete areas to polarized electromagnetic radiation having a wavelength within the range of from about 0.5 to about 2.5 microns and corresponding to a crystal field transition of said cobalt, and c. detecting the change in polarization of said radiation caused by said cobalt to determine the direction of magnetization within said discrete area which has been exposed.

16. In a thermomagnetic recording process for the storage and retrieval of information wherein a. a magnetic field is applied to an element comprising a magnetic inorganic crystalline material magnetized in a direction different from that of said field, said field being of insufficient strength to alter the magnetization of said material at a temperature below the Curie temperature of said material, said field applied while at least one selected area of said material is raised to a temperature above the Curie temperature of said material to change the direction of magnetization in said selected area, b. the temperature of said selected area is lowered below the Curie temperature of said material, c. the element is exposed to electromagnetic radiation, and d. the change in polarization of said radiation caused by the change in the direction of magnetization in said selected area is detected, the improvement wherein:

a. said material has a crystal sublattice which contains magnetically ordered tetrahedrally coordinated divalent cobalt in an amount sufficient to provide a Kerr ellipticity greater than 0.25°, and b. said radiation to which said element is exposed corresponds to a crystal field transition of said divalent cobalt.

17. In a magnetic transducer for use in a magnetic playback head which employs a magneto-optical readout, said transducer containing a thin layer of an inorganic crystalline magnetic material, the improvement wherein said magnetic material has a crystal sublattice which contains magnetically ordered tetrahedrally coordinated divalent cobalt in an amount sufficient to provide, at a temperature greater than about 298°K and at a wavelength corresponding to a crystal field transition of said cobalt, a Kerr ellipticity greater than 0.25°.

18. A magnetic transducer as defined in claim 17 wherein said Kerr ellipticity is obtained at a wavelength within the range of from about 0.5 to about 2.5 microns.

19. In a magnetic recording element comprising a support bearing a layer of an inorganic magnetic crystalline material, said element adapted for use in a magneto-optical readout process, the improvement wherein said magnetic crystalline material has a crystal sublattice which contains magnetically ordered tetrahedrally coordinated divalent cobalt in an amount sufficient to provide, at a wavelength corresponding to a crystal field transition of said cobalt, a Kerr ellipticity greater than 0.25°.

20. A magnetic recording element as defined in claim 19 wherein said Kerr ellipticity effect is obtained at a wavelength within the range of from about 0.5 to about 2.5 microns.

21. A magnetic recording element comprising a support bearing a thin layer of an inorganic magnetic crystalline material, said magnetic crystalline material having an electrical resistivity greater than about $10^4$ ohm-cm., a coercivity greater than about 500 oersteds, and a remenence of its magneto-optical effect greater than about two-thirds the saturation value; said magnetic crystalline material having a crystal sublattice which contains magnetically ordered tetrahedrally coordinated divalent cobalt in an amount sufficient to provide, at a wavelength corresponding to a crystal field transition of said cobalt, a Kerr ellipticity greater than 0.25°; said magnetic crystalline material having the following formula:

| Tetrahedral Sublattice Site | Octahedral Sublattice Site | |
|---|---|---|
| $\left[Co_x^{+2}M_z^{+2}N_{1-x-z}^{+3}\right]$ | $\left[N_{1+x+z-t}^{+3}B_t^{+3}Co_{1-x-z}^{+2}\right]$ | $Y_4^{-2}$ |

wherein

- M is a metal including transition metals selected from periods 2–6 of Groups IA, IIA, IIIA, IVA, IB–VIIB, and VIII of the Periodic Table of the Elements;
- B is a transition metal selected from Periods 4–6 of Groups IB–VIIB and VIII of the Periodic Table of Elements;
- N is a metal selected from group IIa of the Periodic Table of the Elements or a transition metal as defined above;
- Y is oxygen or sulfur;
- $x$ is a number greater than or equal to 0.10 and less than or equal to 1.0;
- $z$ is a number equal to or greater than 0 and less than 1.0; and
- $t$ is a number equal to or greater than 0 and equal to or less than 2.0.

22. A magnetic recording element comprising a support bearing a thin layer of an inorganic magnetic crystalline material, said element adapted for use in a magneto-optical readout process, said magnetic crystalline material having a crystal sublattice which contains magnetically ordered tetrahedrally coordinated divalent cobalt in an amount sufficient to provide, at a wavelength corresponding to a crystal field transition of said cobalt, a Kerr ellipticity greater than 0.25°; said magnetic crystalline material having the following formula:

| Tetrahedral Sublattice Site | Octahedral Sublattice Site | |
|---|---|---|
| $\left[CO_x^{+2}M_z^{+2}N_{1-x-z}^{+3}\right]$ | $\left[N_{1+x+z-t}^{+3}B_t^{+3}Co_{1-x-z}^{+2}\right]$ | $Y_4^{-2}$ |

wherein

- M is a metal including transition metals selected from periods 2–6 of Groups IA, IIA, IIIA, IVA, IB–VIIB, and VIII of the Periodic Table of the Elements;
- B is a transition metal selected from Periods 4–6 of Groups IB–VIIB and VIII of the Periodic Table of the Elements;
- N is a metal selected from Group II*a* of the Periodic Table of the Elements or a transition metal as defined above;
- Y is oxygen or sulfur;
- $x$ is a number greater than or equal to 0.10 and less than or equal to 1.0;
- $z$ is a number equal to or greater than 0 and less than 1.0; and
- $t$ is a number equal to or greater than 0 and equal to or less than 2.0.

23. A magnetic recording element as defined in claim 22 wherein said magnetic crystalline material is selected from the group consisting of: $Fe_{0.75}Co_{0.25}Cr_2S_4$, $CoFeRhO_4$, $Fe_{0.5}Co_{0.5}Cr_2S_4$, and $CoCr_2S_4$.

24. A magnetic recording element as defined in claim 22 wherin said magnetic crystalline material is $CoCr_2S_4$ or $CoCr_2O_4$.

* * * * *